(12) United States Patent
Kaegi et al.

(10) Patent No.: US 7,212,565 B2
(45) Date of Patent: May 1, 2007

(54) METHOD FOR PRODUCING A SEQUENCE SYNCHRONIZED WITH AN EXTERNAL SIGNAL AND SYNCHRONIZATION CIRCUIT AND RECEIVER

(75) Inventors: Daniel Kaegi, Ruti (CH); Heinz Mathis, Uerikon (CH); Andreas Thiel, Wilen bei Wollerau (CH)

(73) Assignee: U-Blox AG, Thalwil (CH)

( * ) Notice: Subject to any disclaimer, the term of this patent is extended or adjusted under 35 U.S.C. 154(b) by 705 days.

(21) Appl. No.: 10/617,657

(22) Filed: Jul. 14, 2003

(65) Prior Publication Data

US 2004/0120439 A1  Jun. 24, 2004

(30) Foreign Application Priority Data

Dec. 24, 2002  (EP)  .................. 02406139

(51) Int. Cl.
  *H04J 15/00*  (2006.01)
(52) U.S. Cl. ..................... 375/150
(58) Field of Classification Search ................ 375/340, 375/319, 130, 147, 149, 140, 145, 343, 142, 375/150
See application file for complete search history.

(56) References Cited

U.S. PATENT DOCUMENTS 4,114,155 A * 9/1978 Raab ........................ 342/394

5,737,360 A    4/1998 Grinstein et al.
2005/0254558 A1* 11/2005 Dutka ........................ 375/149

FOREIGN PATENT DOCUMENTS

WO  WO 01/37441  5/2001

OTHER PUBLICATIONS

B. Vigoda, Masters Thesis, Mit. Media Lab., Online, XP-002167577, pp. 9-90, "A Nonlinear Dynamic System for Spread Spectrum Code Acquisition", Aug. 9, 1999.

* cited by examiner

*Primary Examiner*—Tesfaldet Bocure
(74) *Attorney, Agent, or Firm*—Oblon, Spivak, McClelland, Maier & Neustadt, P.C.

(57) ABSTRACT

A method for generating an internal sequence of analog values having a specific period includes producing an intermediate value by a logical combination of an actual value of the external sequence with an actual value of a second generating sequence, producing an input value to an analog feedback shift register by superposition of the intermediate value with an analog feedback value derived according to a feedback function from analog values in the analog feedback shift register, and feeding the input value to an input of the analog feedback shift register. A position of an actual value of the second generating sequence corresponds to a position of a segment in the first generating sequence, the segment including a determinative set of n binary values derived from the analog values in the analog feedback shift register.

24 Claims, 8 Drawing Sheets

METHOD FOR PRODUCING A SEQUENCE SYNCHRONIZED WITH AN EXTERNAL SIGNAL AND SYNCHRONIZATION CIRCUIT AND RECEIVER

FIELD OF THE INVENTION

The invention relates to a method for producing an internal sequence of analog values having a specific period which corresponds to an external sequence coded in a received signal and is synchronous with it, according to the precharacterizing clause of Claim 1, and also a synchronization circuit for carrying out the method and a receiver comprising at least one said synchronization circuit. Methods of this type serve for decoding specific signals in communication technology, as used in particular in mobile telephony and in positioning systems, such as GPS.

PRIOR ART

In GPS receivers, which are used below as an example, a plurality of signals emitted by satellites have to be assigned to the corresponding satellites and their phase positions accurately determined so that the transit times and hence the distance of the receiver from the satellites can be determined. In each case a digital signal which is based on a specific fundamental sequence of so-called chips which characterizes the satellites, a pseudorandom sequence of length N=1023, is modulated on the signals having a carrier frequency of 1575.42 MHz by means of phase modulation. The transmission time of the fundamental sequence is 1 ms, and the transmission time of a chip is therefore the 1023 th part of a millisecond, i.e. slightly less than 1 µs.

The satellite also transmits digital data by logical combination of a data bit value with 20 consecutive copies of the fundamental sequence. Since the transmission of the fundamental sequence takes 1 ms, the data transmission rate is 50 bit/s. The received signal therefore consists in each case of a sequence of repetitions of the 20-fold fundamental sequence, the 20-fold fundamental sequence either being inverted or not, depending on the data bit value. The fundamental sequence is a so-called Gold sequence. The signal is usually very weak and has a large negative signal/noise ratio on the decibel scale.

Various methods have been proposed for identifying the fundamental sequence and determining the phase position of the received signal. Thus, for example, while an external sequence of binary values is derived from the received signal in a high frequency stage, each of the possible fundamental sequences is generated locally in the receiver and in each case copies thereof shifted by various intervals are correlated with the external sequence. In all cases where no agreement is found, the search can be terminated only after checking all possible shifts of the fundamental sequence. Owing to the relatively large length thereof, this is a time-consuming procedure, unless it is performed in a highly parallel manner, which, however, increases both the circuit complexity and hence the costs of the receiver and the energy consumption as well.

According to another method (WO-A-02/25 829), a segment of the external sequence is subjected to a Fourier transformation and is multiplied by the Fourier transformation of the fundamental sequence, which transformation is stored in the receiver, and the result is subjected to inverse transformation. This corresponds to a convolution of the segment of the external sequence with the fundamental sequence, the resulting values of which in each case correspond to the correlations of the segment with that copy of the fundamental sequence which has been time-shifted by a corresponding number of chips, so that their maximum indicates the phase position. However, this method too requires considerably complex circuitry and leads to a relatively high energy consumption in the receiver.

For so-called m-sequences, it is also known (U.S. Pat. Nos. 5,579,337, 5,612,973, WO-A-01/37 441) that an internal sequence synchronous with an external sequence can be generated by using an analog feedback shift register which is fed in each case with an input value which was obtained from a superposition of a feedback value with the actual value of the external sequence, which feedback value is generated by logical combination of older values. However, it has been found that this method cannot be directly applied to other sequences, such as, for example, Gold sequences. Moreover, the embodiments of the method which have become known to date fail in the case of large negative signal/noise ratios, as are typical in particular for GPS signals.

SUMMARY OF THE INVENTION

It is the object of the invention to provide a method of the generic type which permits, with relatively uncomplicated circuitry and low energy consumption, rapid and reliable identification of the fundamental sequence and determination of the phase position of the external signal. This object is achieved by the features in the characterizing clause of Claim 1.

It is also intended to provide a synchronization circuit suitable for carrying out the method and a suitable receiver. These objects are achieved by the features in the characterizing clause of claims 17 and 20, respectively.

BRIEF DESCRIPTION OF THE DRAWINGS

Below, the invention is explained in more detail on the basis of figures which show only an embodiment.

DESCRIPTION OF THE PREFERRED EMBODIMENTS

The method according to the invention and the synchronization circuit for carrying it out and the receiver are described below for a GPS receiver by way of example. Method, synchronization circuit and receiver are, however, suitable for all applications in which data are transmitted CDMA-coded and the fundamental sequence of binary values which is used has the property that it is capable of being generated by logical combination of two generating binary sequences, at least one of which is a m-sequence or has the property that it can be generated by a binary feedback shift register and the phase position of segments of the length of the shift register can be unambiguously determined in the fundamental sequence. In addition to Gold sequences, Kasami sequences and others which can be found in the literature fulfil this condition. For further examples, cf. for example J. D. Olsen: Nonlinear binary sequences with asymptotically optimum periodic cross-correlation (Dissertation University of California 1977). The apparatuses described below, with at most insignificant adaptations, can also be used in an application well beyond the GPS system.

As mentioned, Gold sequences are used in the GPS system. They can be generated by logical combination of two so-called preferred pairs of m-sequences. Each m-sequence can be generated by a binary feedback shift register of length n and has, inter alia, the property that, with one exception, each sequence of length n—in the present case, n=10—occurs exactly once in the m-sequence of length $N=2^n-1$—in this case 1023—i.e. the position of such a segment in the m-sequence can be unambiguously determined.

Various representations are possible for the binary quantities and their logical combination. Most familiar is the representation of 0 and 1 with the addition modulo 2 (also known as exclusive-or logical combination) $(b_1, b_2) \rightarrow b_1 \oplus b_2$ as both an associative and a commutative operation, according to the following table:

| | $b_1$ | |
|---|---|---|
| $b_2$ | 0 | 1 |
| 0 | 0 | 1 |
| 1 | 1 | 0 |

The logical combination of an element with the zero element 0 leaves the former unchanged, while the logical combination with 1 converts 0 into 1 and 1 into 0. Since $b \oplus b$ is always 0, the logical combination also has the property that $$(b_1 \oplus b_2) \oplus b_2 = b_1 \oplus 0 = b_1, \quad (1)$$

i.e. the logical combination of the result of combining two initial elements with one of the initial elements results in the other initial element.

The transformation $$b \rightarrow p = 2b-1 \quad (2)$$

leads to the following representation, which is equivalent but more easily implemented and which is used in the embodiment:

| | $p_1$ | |
|---|---|---|
| $p_2$ | $-1$ | 1 |
| $-1$ | $-1$ | 1 |
| 1 | 1 | $-1$ |

Here, the logical operation is produced by the mapping $$(p_1, p_2) \rightarrow p_1 \oplus p_2 = p_1 \cdot p_2. \quad (3)$$

$-1$ is the zero element. The logical operation can evidently be readily extended to include any real numbers, i.e. analog values.

Each m-sequence $p_1, \ldots, p_N$ with $N=2^n-1$ can be generated, starting from an initial sequence $p_1, \ldots, p_n$ of length n which does not consist exclusively of zero elements, by recursively forming further values according to the pattern:

$$p_i = p_{i-n} \oplus p_{i-rm} \oplus \ldots \oplus p_{i-r1}, \quad (4)$$

where $0 < r_1 < \ldots r_m < n$ and the polynomial $x^n + x^{rm} + \ldots + x^{r1} 1$ is prime with respect to the arithmetic defined above. For example, in each case $$P_i = P_{i-10} \oplus p_{i-3} \quad (5)$$

may apply. Since all N possible segments of length n, apart from the segment consisting only of zero elements, are passed through before the initial sequence recurs, the choice of the latter is of no importance.

For the formation of a Gold sequence $s_1, \ldots, s_N$, two m-sequences $p_1, \ldots, p_N$ and $q_1, \ldots, q_N$, which form a so-called preferred pair of m-sequences, are used as generating sequences for the Gold sequence, i.e. the Gold sequence is generated from these sequences by element-by-element logical combination:

$$s_i = p_i \oplus q_i \quad (6)$$

Kasami sequences are likewise generated by element-by-element logical combination from two generating sequences, one of which is a m-sequence. For the properties of m-sequences, Gold sequences, Kasami sequences, reference is made to the literature, e.g. E. H. Dinan, B. Jabbari: Spreading Codes for Direct Sequence CDMA and Wideband CDMA Cellular Networks, IEEE Communications Magazine 9/1998, page 48–54.

The GPS receiver shown in FIGS. 1–4 and formed according to the invention has a high frequency part (FIG. 1) with an antenna 1 for receiving the signals emitted by the GPS satellites, which is followed by a low-noise self-regulating amplifier 2 and a band-pass filter 3. This is followed by a first mixer stage comprising a mixer 4, which mixes the amplified and filtered received signal with a sinewave signal of 1391.82 MHz which is generated by an oscillator 5, and a band-pass filter 6 and a second mixer stage fundamentally of the same design and comprising a mixer 7, which mixes the signal with a sinewave signal of frequency 180.6 MHz which is generated by an oscillator 8, and a band-pass filter 9. The two mixer stages are finally followed by an A/D converter 10.

In the baseband part (FIG. 2), the signal path branches into a I path and a Q path, each with a further mixing stage. The I-path contains a mixer 11 in which the signal is mixed with a sinewave signal of about 3 MHz which is generated by an oscillator 12, while the second part contains a further, otherwise identical mixer 13 in which the same signal is mixed with the sinewave signal of the oscillator 12, which is phase-shifted by 90° by a phase shifter 14. The mixer 11 is followed by a low-pass filter 15, behind which the path again branches, and does so to sampling elements 16, 17, to the first one directly and to the second one via a delay element 18, which delays the signal by a ΔT of about 0.5 μs. A circuit of exactly the same design is connected to the mixer 13. The sampling element 16 is followed by a buffer 19 and a further branch. One path leads directly to an output and the other via an inverter 20. A circuit of exactly the same design is connected to the sampling element 17. Altogether, the baseband part has 8 outputs, each of which is connected to the input of a series of separate synchronization circuits, each of which is assigned to a specific satellite and synchronizes with the fundamental sequence used by it.

Figure 4:
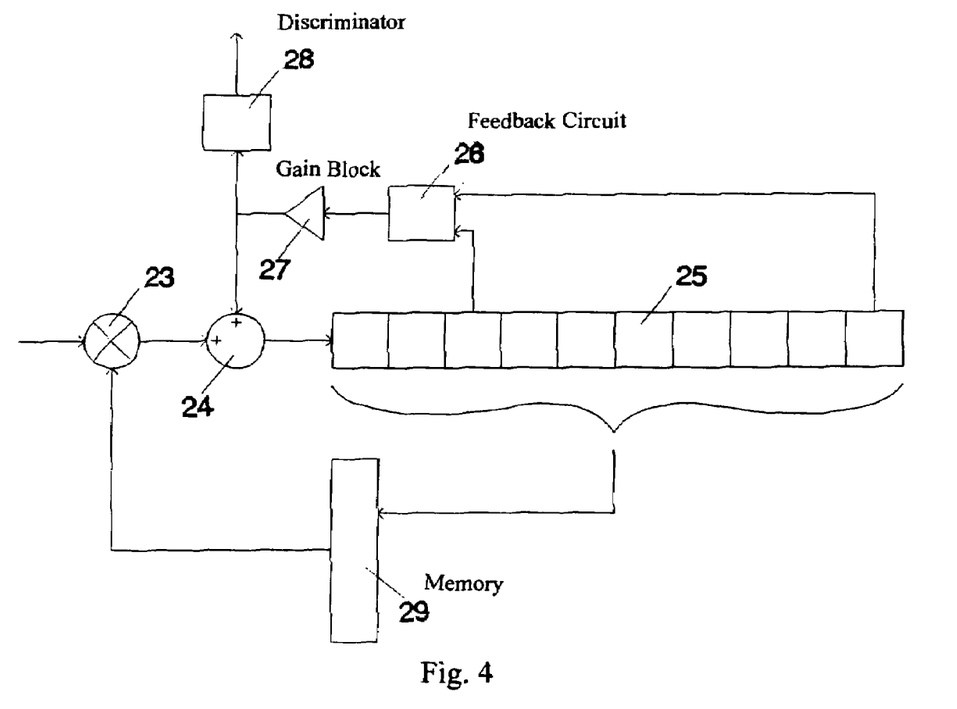
FIG. 4 shows a synchronization circuit according to the invention.
Figure 5:
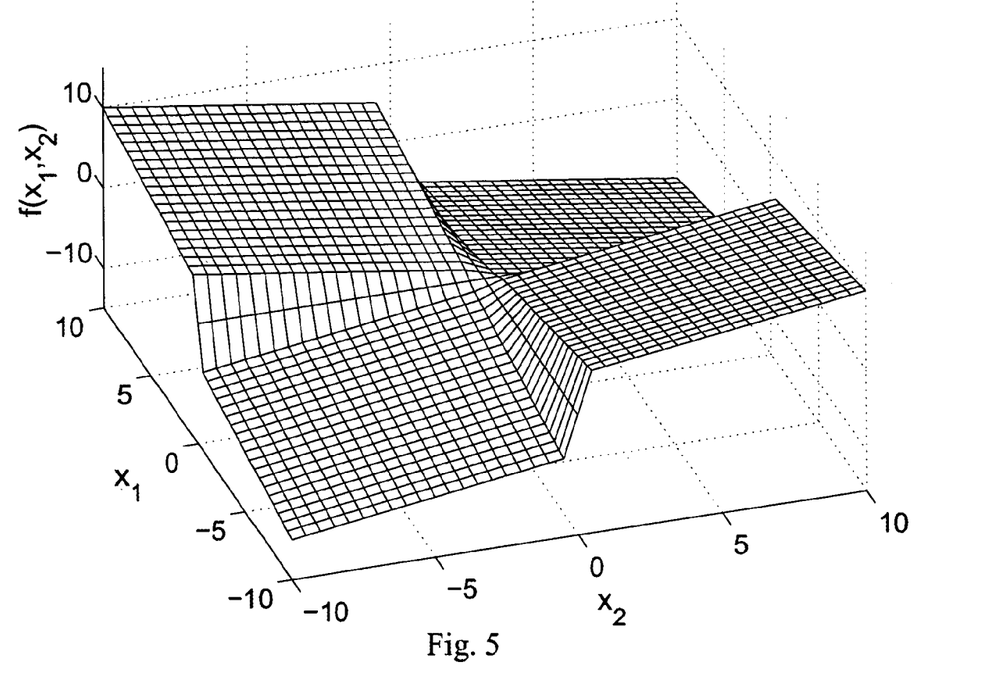
FIG. 5 shows the graph of a feedback function used in the method according to the invention.

The buffer 19 comprises (FIG. 3) an adder 21 and a shift register 22 having 1023 memory locations for analog values. The output of the shift register 22 is led back to the second input of the adder 21. Each synchronization circuit (FIG. 4) comprises a logic element 23 which follows the input and which is followed by an adder 24, and furthermore an analog feedback shift register 25 having ten memory locations. A feedback circuit 26 is connected with taps at the tenth memory location and at a further memory location or a plurality of further memory locations. In the example, in accordance with (5), only one further tap is present, at the third memory location. In the feedback circuit 26, the tapped analog values are combined according to a feedback function. The graph of a possible feedback function having two arguments $f(x_1, x_2)$ is shown in FIG. 5. The output of the feedback circuit 26 is connected via a gain block 27 to the second input of the adder 24. The adder 24 thus forms a superposition circuit for superposing a feedback value with an intermediate value obtained from the logic element 23.

The output of the gain block 27 is also connected to a discriminator 28 which contains a squaring circuit or another circuit mapping the input signal into the positive domain, a low-pass filter and a threshold value detector and outputs a binary signal. The discriminator can also be connected at some other point to the loop formed by the shift register 25, the feedback circuit 26, the gain block 27 and the adder 24. Also provided is a memory 29 to which is fed a determinative set of binary values which is derived from all values stored in the shift register 25 and whose output is connected to the second input of the logic element 23.

Figure 6:
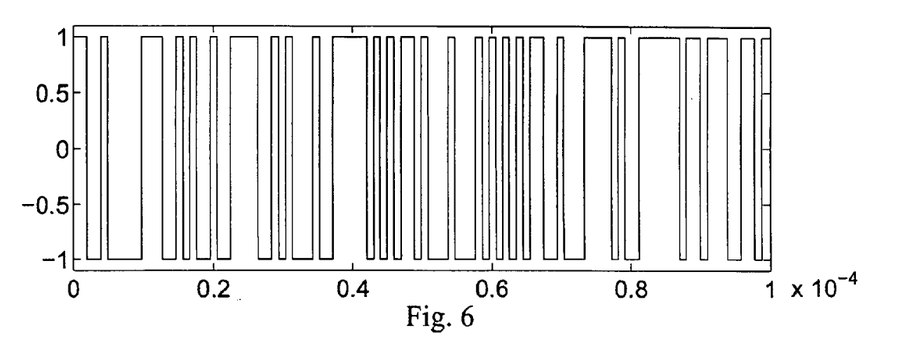
FIG. 6 shows a section of a Gold sequence as coded in the signal of a GPS satellite.
Figure 7:
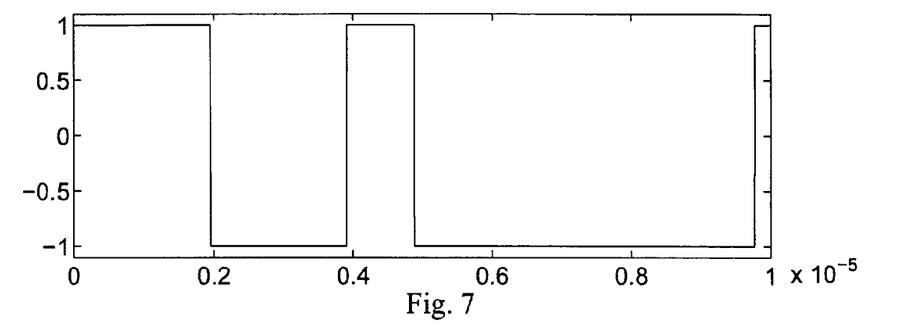
FIG. 7 shows, on a larger scale, a section from the Gold sequence of FIG. 6.

FIG. 6 shows a 100 μs section of the fundamental sequence of the GPS satellite with the ID number 1. This fundamental sequence is a Gold sequence which can be generated from a first generating m-sequence $p_1, \ldots, p_{1023}$, which is defined by the feedback according to (5), and a second generating m-sequence $q_1, \ldots, q_{1023}$. FIG. 7 shows the first 10 μs of the section of FIG. 6. The fundamental sequence is modulated in the satellite onto a carrier signal with a frequency of 1575.42 MHz, in such a way that each change of binary value therein is represented by a phase jump of 180° in the carrier signal.

Figure 8:
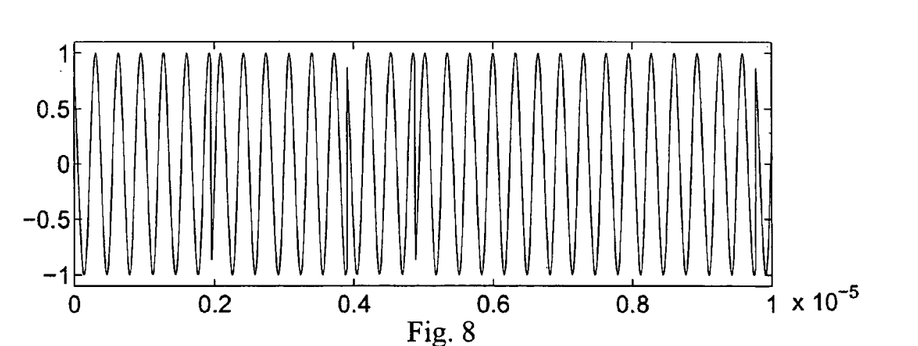
FIG. 8 shows a section of the signal at the output of the high frequency part, which section corresponds to the section of FIG. 6, FIGS. 9, 10 show sections of the signal at specific points of the baseband part, which sections correspond to the section of FIG. 6, FIGS. 11a–c, 12a–c show sections of the signal at further points of the baseband part, which sections correspond to the section from FIG. 6.

Of the signals received by the antenna 1 and amplified by the amplifier 2, substantially the signals originating from the GPS satellites present in the reception range pass through the band-pass filter 3 into the adjacent mixer stages, where the carrier frequency is converted down to an intermediate frequency of 3 MHz. The signal prepared in this manner and corresponding to the section shown in FIG. 7 is shown in FIG. 8. The signal is digitized in the A/D converter 10 with a specific bit resolution, e.g. 12 bit for the magnitude and an additional bit for the sign. The obtained signal values can be represented as floating point numbers or as integers. However, they are referred to below as analog values to distinguish them from binary values. The figures show signals without a background noise, whereas in fact the very weak signals in the antenna are buried in high background noise, the typical signal/noise ratio being about −35 dB.

Figure 9:
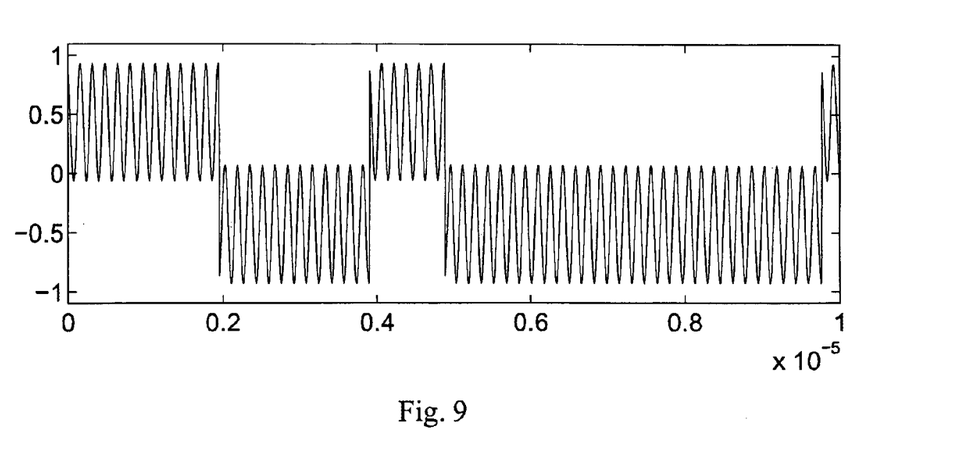
Figure 10:
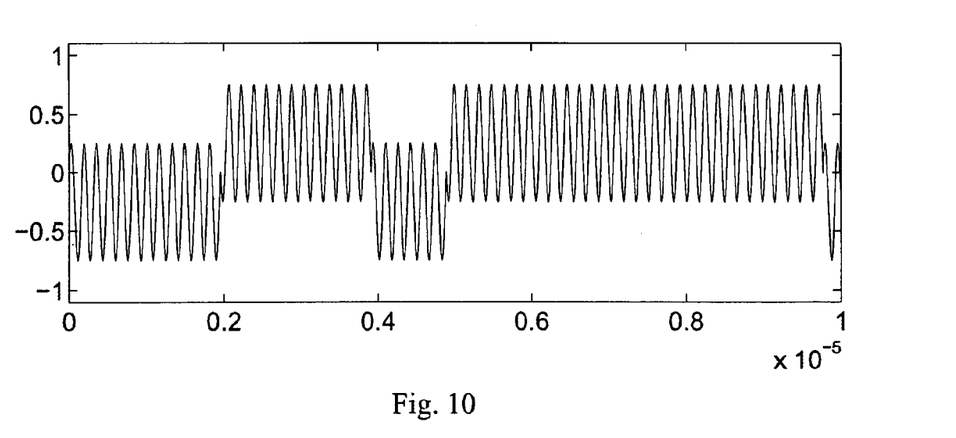

In the mixers 11 and 12, the signals shown in FIGS. 9 and 10 are now generated by mixing with sinewave signals of about 3 MHz. The first signal originates from the I-path, i.e. from mixing of the signal with the sinewave signal generated by the oscillator 12 in the mixer 11, and the second from the Q-path, i.e. from mixing with the sinewave signal phase-shifted by 90° in the mixer 13. The result is a superposition of the signal coding the fundamental sequence with a sinewave signal whose frequency corresponds to the sum of the frequencies, i.e. about 6 MHz. The doubling of the paths is required because, in the case of a phase shift of the sinewave signal by ±90° relative to the signal originating from the A/D converter 10, that component thereof which codes the fundamental sequence would be cancelled out in the I path. In the present case, since the phase shift is only 30°, the corresponding component in the I-path is more pronounced.

Figure 1:
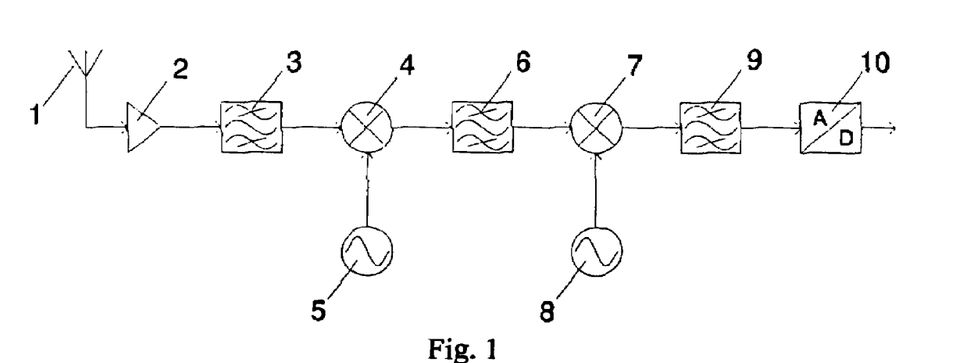
FIG. 1 substantially shows a high frequency part of a receiver according to the invention.
Figure 2:
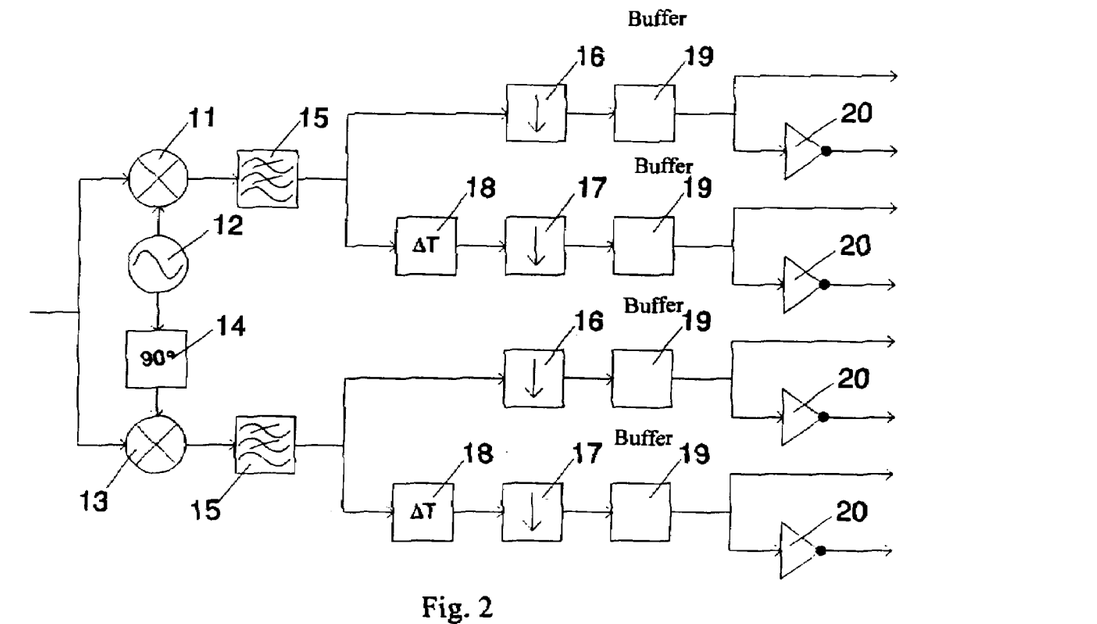
FIG. 2 shows a baseband part of said receiver.

The frequency of the oscillator 12 can be controlled. Since the carrier frequency can be Doppler-shifted by a few kHz, depending on the actual movement of a satellite, a corresponding frequency range must, for example, be swept over step by step. For this purpose, the frequency of the oscillator 12 can be varied in a controlled manner.

Figure 11A:
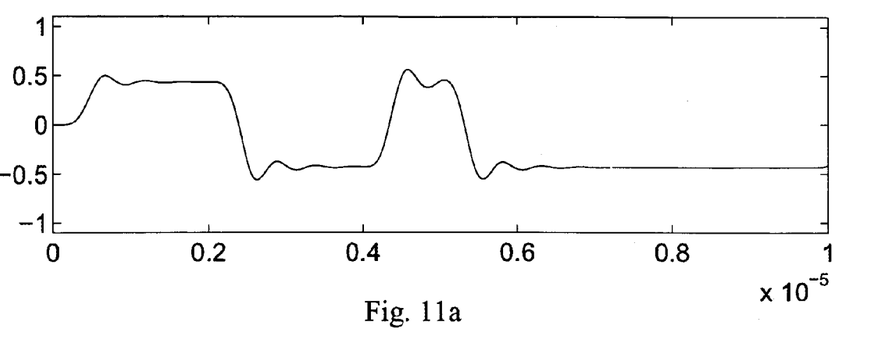
Figure 11B:
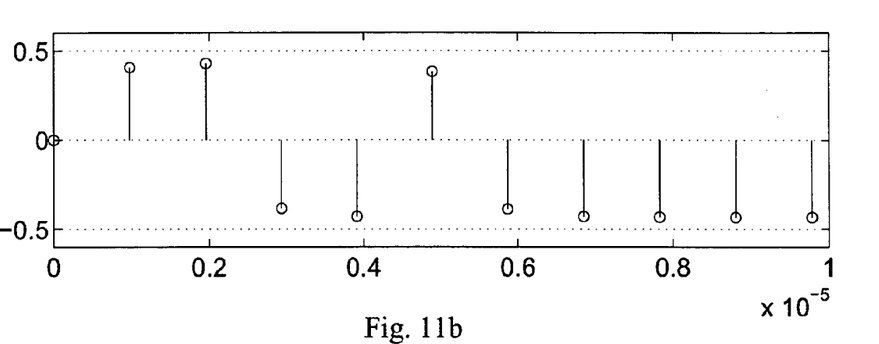
Figure 11C:
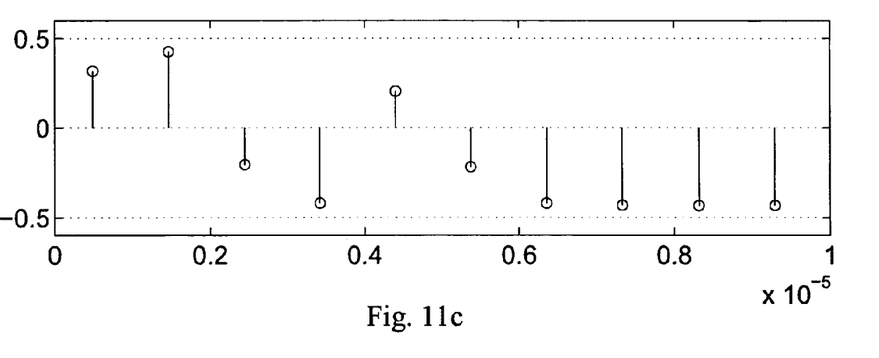
Figure 12A:
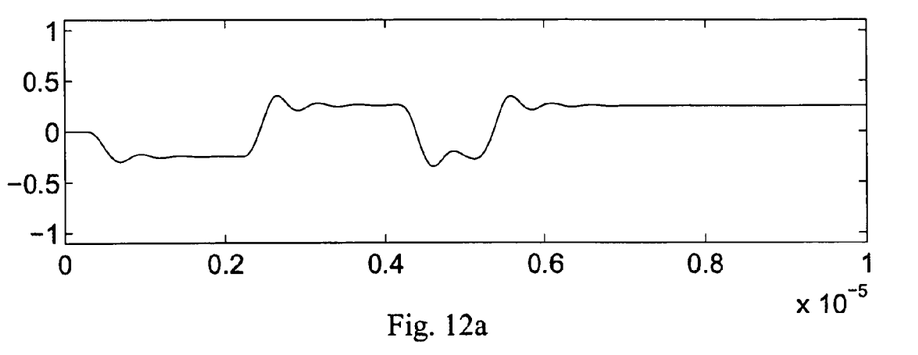
Figure 12B:
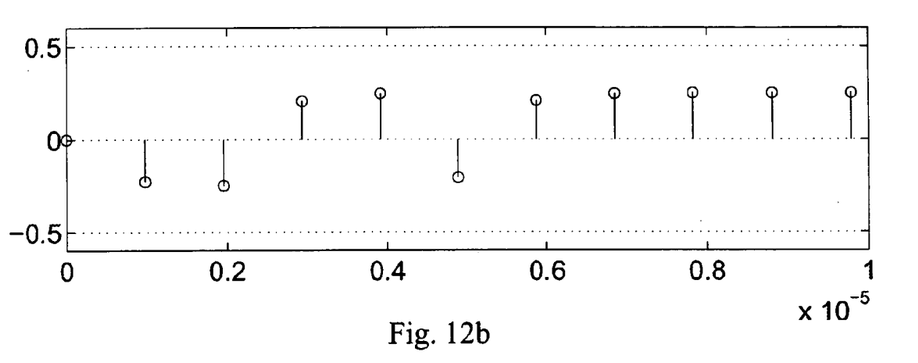
Figure 12C:
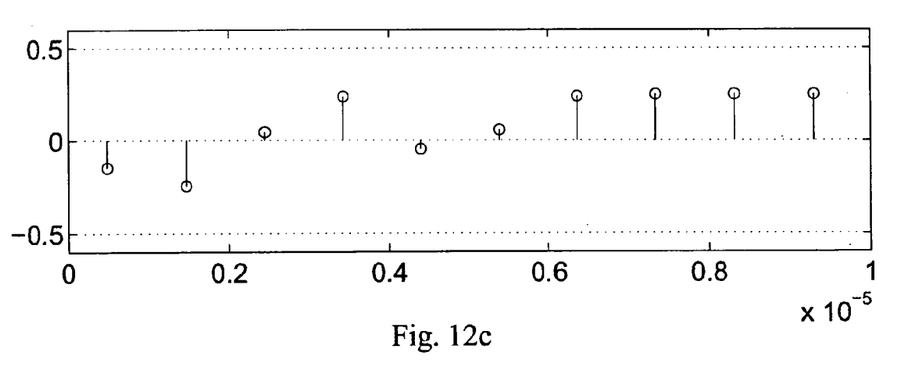

The signal is now fed into the I- and in the Q-path, in each case via a low-pass filter 15 which filters out the high-frequency components, directly to the sampling element 16, and via the delay element 18, to the sampling element 17. By means of the delay of the signal by a ΔT of about 0.5 μs, which corresponds to half a chip length, in the delay element 18, it is ensured that at least one sampling operation is effected at points in time where the signal is well defined. FIG. 11a shows the signal of the I-path after the low-pass filter 15, i.e. before the sampling, FIG. 11b shows the sequence of analog values which the sampling element 16 generates therefrom and FIG. 11c shows the analog value at the output of the sampling element 17. FIGS. 12a–c show the corresponding signals of the Q-path. In the example, the output signal of the sampling element 16 evidently most clearly reflects the original sequence of FIG. 7. For easier comprehension, in each case only a section of the signal sent by satellite No. 1 is shown in the various stages of processing. In fact, however, in each case a superposition of all received signals is processed in this stage of the receiver.

Figure 3:
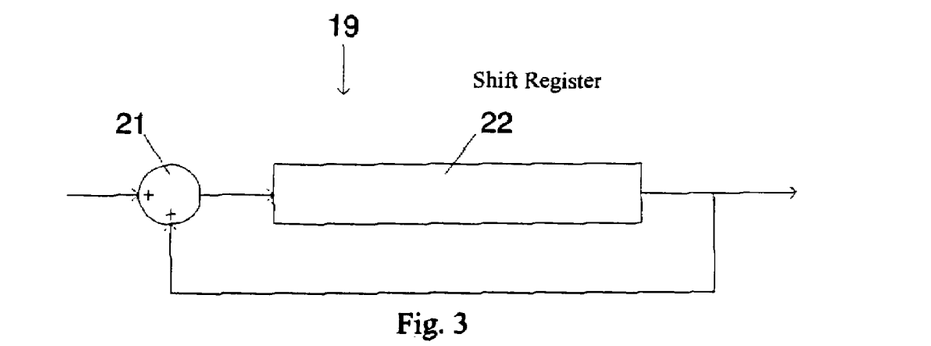
FIG. 3 shows a component of the baseband part.

The corresponding analog values now pass to the buffer 19. There, a plurality, for example, twenty, instances of consecutively determined sequences of in each case 1023 values, each of which corresponds to a fundamental sequence with added background noise—which after all is sent twenty times in succession for transmitting one data bit—are superposed, i.e. the 1023 analog values of the first instance which correspond to the chips of the fundamental sequence are stored in the memory locations of the shift register 22 and then fed back sequentially to the adder 21, and the corresponding values of the second instance are added thereto and the original value is overwritten with the result. This is repeated until the sum of the twenty instances is stored in the shift register 22.

Since, in the summation, the noise is superposed only in an uncorrelated manner, a substantial improvement of the signal/noise ratio can be achieved thereby. If, however, the data bit value changes during the summation and the corresponding fundamental sequence is inverted, the summation can also lead to partial cancellation. In this case, however, no synchronization occurs within a specific time span with regard to this fundamental sequence which then leads to termination and filling of the shift register 22 with new data, as will be explained further below.

The basic sequence stored in the buffer 19 is now read out repeatedly for generating an external sequence and in each case fed to the inputs of two synchronization circuits (FIG. 4), in particular to one directly and to the other via an inverter 20, since the fundamental sequence may be inverted by logical combination with the data bit.

The various basic sequences stored in the four buffers 19 and derived from analog values $a_1, \ldots, a_{1023}$ derived from the received signal are now fed, directly and in inverted form, as an external sequence repeatedly to the eight following instances of the synchronization circuit according to FIG. 4, which synchronize with the fundamental sequence of satellite No. 1. An instance which acquires an advantageous sequence, i.e. one which contains a component as similar as possible to the coded fundamental sequence $s_1, \ldots, s_{1023}$, should now generate therefrom an internal sequence which corresponds to the fundamental sequence $s_1, \ldots, s_{1023}$ of satellite No. 1 and which additionally should agree with the external sequence with regard to the phase position. This is possible in principle in a satisfactory manner for m-sequences by means of a synchronization circuit in which a value which was derived by feedback from the shift register is superposed with the external sequence and the result is fed back to the shift register, but not for Gold sequences.

In the synchronization circuit according to the invention, an intermediate signal is therefore first generated by element-by-element logical combination with a further sequence, from which intermediate signal the input signal to the shift register 25 is then obtained. In the synchronized state in which the generated internal sequence of analog values substantially corresponds to the external sequence, apart from a noise component, the synchronization circuit functions as follows:

The external sequence corresponds to repetitions of the basic sequence which contains the fundamental sequence $s_1, \ldots, s_{1023}$ with added background noise, said sequence being generated according to (6) by element-by-element logical combination of the first generating m-sequence $p_1, \ldots, p_{1023}$ and of the second generating m-sequence $q_1, \ldots, q_{1023}$. In the synchronized state, the shift register 25 generates the first generating m-sequence. The content of the shift register 25, $a_{i-10}, \ldots, a_{i-1}$, thus corresponds to a segment of this m-sequence, i.e. $p_{i-10}, \ldots, p_{i-1}$ for any i with $1 \leq i \leq 1023$.

Since it is a m-sequence, this i can be uniquely determined and hence also the corresponding value $q_i$ of the second generating sequence. This value is read out of the memory 29, which is structured as a table with 1023 memory locations, the sign bits of the values $p_{i-10}, \ldots, p_{i-1}$ being used as a determinative set, which then serves as an address of the table location of $q_i$.

The next element of the external sequence, which, apart from a noise component, substantially corresponds to $s_i$, is logically combined with $q_i$ in the logic element 23, which, according to (6) in conjunction with (1), substantially gives $p_i$ as an intermediate value. This value is added in the adder 24 to the feedback value from the feedback circuit 26 which is scaled in the gain block 27. However, this latter value likewise corresponds substantially to pi since it was in fact generated by the feedback, defining the first generating sequence, from the values $a_{i-10}, \ldots, a_{i-1}$ corresponding substantially to $p_{i-10}, \ldots, p_{i-1}$ in the specific case by combination of $a_{i-10}$ with $a_{i-3}$. The superposition of the feedback value with the intermediate value thus corresponds to $a_i$ and is fed as a new input value into the shift register 25. The system is evidently consistent. The sequence of $a_i$ generated in the analog feedback shift register 25 substantially corresponds to repetitions of the first generating m-sequence $p_1, \ldots, p_{1023}$. By element-by-element logical combination with the second generating m-sequence $q_1, \ldots, q_{1023}$, an internal sequence corresponding to repetitions of the fundamental sequence $s_1, \ldots, s_{1023}$ can be generated therefrom.

For the stability and the synchronization behaviour in the case of the large negative signal/noise ratios prevailing in GPS receivers, the choice of a suitable feedback function f is of considerable importance. With the functions known to date, it has not been possible to achieve synchronization in the case of sequences with a high background noise. In the search for more suitable feedback functions, various features have proved to be advantageous. Thus, in the case of the chosen representation of the binary values—in the case of other representations, the properties must in some cases be appropriately transformed—it should as far as possible have the following properties: If the magnitudes of the arguments are 1, the magnitude of the feedback value should be slightly less than 1, preferably between 0.90 and 0.99. It is advantageous if, in the case of arguments of magnitude 1, the feedback function gives a value of magnitude 1, i.e.

$$|f(x_1, \ldots, x_m)|=1 \text{ for } |x_1|= \ldots =|x_m|=1, \tag{7}$$

and the function value is then multiplied by a selectable factor k<1, in particular 0.90<k<0.99. This multiplication is performed by the adjustable gain block 27, which follows the feedback circuit 26 evaluating the feedback function.

The sign of the feedback function should in each case be the inverse of the sign of the product of the negative arguments, i.e.

$$\mathrm{sig}(f(x_1, \ldots, x_m))=-\mathrm{sig}\,((-x_1)\cdot \ldots \cdot(-x_m)) \tag{8}$$

If $x_1, \ldots, x_m$ each have the magnitude 1, i.e. can also be regarded as binary quantities, said two properties result in $f(x_1, \ldots, x_m)$ corresponding to the logical combination $x_1 \oplus \ldots \oplus x_m$.

It is furthermore advantageous if the feedback function f is invariant on interchanging the arguments. It should be antisymmetrical and monotonic as a function of each individual argument, i.e. when other arguments are kept constant.

It has proved to be particularly advantageous if the feedback function in each sector which is defined by specific values of the signs of the arguments is substantially a linear combination of the arguments. The resulting discontinuities at the sector limits can be smoothed, but it has been found that such modifications tend to have an adverse effect on the behaviour and therefore should not be large. A feedback function f which has all the above-mentioned properties and with which it was possible to achieve synchronization even in the case of signals with high background noise is $$f(x_1, \ldots, x_m)=-\mathrm{sig}((-x_1)\cdot \ldots \cdot(-x_m))\cdot(|x_1|+ \ldots +|x_m|)/m$$

Apart from scaling which ensures that (7) is satisfied, this function is in each sector a linear combination of the arguments with coefficients of +1 or −1.

For two variables, i.e.

$$f(x_1,x_2)=-\mathrm{sig}(x_1\cdot x_2)\cdot(|x_1|+|x_2|)/2, \tag{10}$$

it is shown in FIG. 5, only the transitions at the sector limits having been smoothed by linear interpolation.

Figure 13:
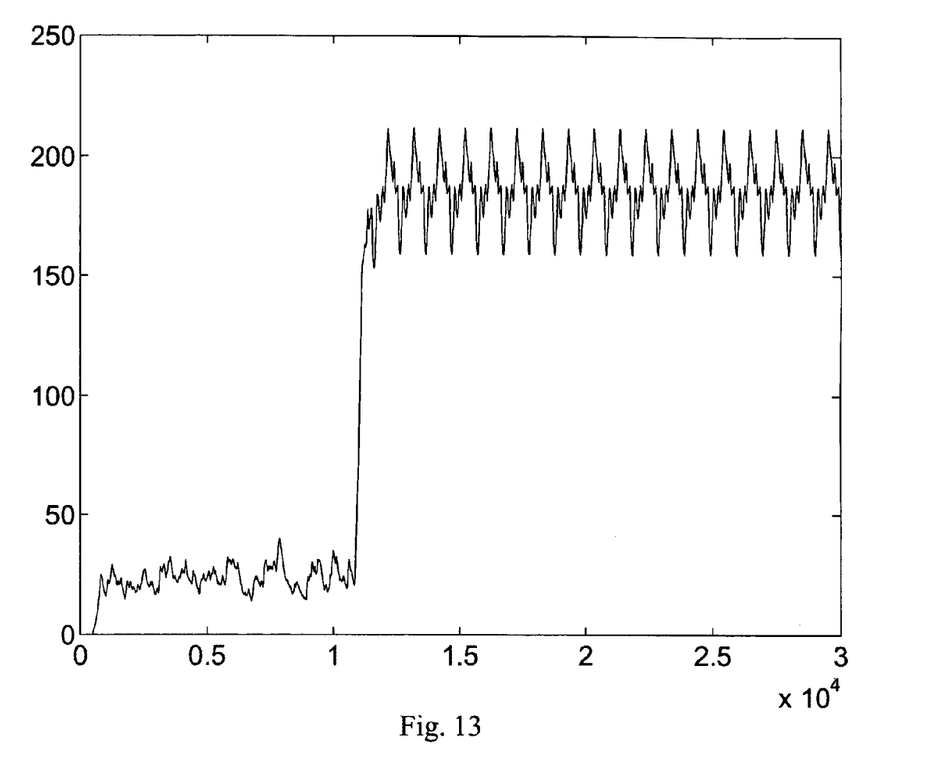
FIG. 13 shows the development of the power of a feedback signal in the baseband part during synchronization.

Since the synchronization circuit operates with stored data, its operating speed is independent of the chip rate of the received signal and can be substantially higher. The power of the internal sequence generated, which is taken off at the output of the gain block 27, serves as a criterion for successful synchronization. While the elements of the internal sequence have about the same value as those of the external sequence before synchronization, the latter sequence is amplified by a factor $1/(1-k)$, which is thus usually between 10 and 100, when synchronization is complete. The power of the internal sequence $(a_1)_i$, $i=1, \ldots, \mathbf{1023}$ accordingly increases sharply, as shown in FIG. 13. This increase is registered by the discriminator 28, in which the power is determined by squaring and smoothed by filtering through a low-pass filter and averaged over a relatively long time segment, and finally the result is compared with a threshold value. It outputs a corresponding binary signal which indicates that synchronization is complete.

If no synchronization occurs after a specific time, there is in general no sense in continuing the procedure with the same data. The absence of synchronization may be accidental, for example due to a particularly unfavourable form of the noise component, due to an unfavourable phase position of the received signal or due to an unfavourable sampling time before a data bit change, which results in the addition, in the buffers 19 (FIG. 2) of instances of sequences in which the component containing the desired fundamental sequence occurs with different signs, which can lead to a serious attenuation of said component compared with the noise component. In such cases, it is expedient to fill the buffers 19 with new basic sequences and to begin the synchronization process again with them.

Up to 32 satellites whose fundamental sequences differ are in use in the GPS system. Since it is intended to employ the signals of all satellites in the receiving range, the receiver should in each case contain types of synchronization circuits corresponding to all satellites in use, each type synchronizing with the fundamental sequence of one of the satellites. The types differ in memory content, which determines the second generating m-sequence $q_1, \ldots, q_{1023}$. Instead of being located at the end of the baseband part, where 32 different synchronization circuits can be connected to each output, the branching to the various types can also be located further to the front in the signal path, e.g. at the end of the high frequency part.

This has the advantage that, for example, the frequency of the oscillator 12 can be set more specifically to the trajectory of the respective satellite with utilization of further information. On the other hand, multiple implementation of the entire baseband part is of course required.

The example described can of course be modified in many ways. Thus, for example, intermediate frequencies other than those mentioned can be chosen or some or all of the intermediate stages can be omitted. Various possibilities are also available for implementing the synchronization circuit and the receiver; in particular different degrees of integration can be chosen. The shift registers can, for example, each be formed by a corresponding memory with linear addressing and a write pointer and a read pointer.

List of Reference Symbols

| 1 | Antenna |
| 2 | Amplifier |
| 3 | Band-pass filter |
| 4 | Mixer |
| 5 | Oscillator |
| 6 | Band-pass filter |
| 7 | Mixer |
| 8 | Oscillator |
| 9 | Band-pass filter |
| 10 | A/D converter |
| 11 | Mixer |
| 12 | Oscillator |
| 13 | Mixer |
| 14 | Phase shifter |
| 15 | Low-pass filter |
| 16 | Sampling element |
| 17 | Sampling element |
| 18 | Delay element |
| 19 | Buffer |
| 20 | Inverter |
| 21 | Adder |
| 22 | Shift register |
| 23 | Logic element |
| 24 | Adder |
| 25 | Shift register |
| 26 | Feedback circuit |
| 27 | Gain block |
| 28 | Discriminator |
| 29 | Memory |

The invention claimed is:

1. Method for generating an internal sequence of analog values that are synchronous to an external sequence coded in a received signal, the analog values having a specific period, which corresponds to and is synchronous with the external sequence, and the external sequence comprising repetitions of a fundamental sequence of length N, which substantially corresponds to a sequence of binary values which can be produced by logical combination of a first generating binary sequence of length N with a non-constant second generating binary sequence of length N, the first generating binary sequence being capable of being generated by a binary feedback shift register of length n, in which a next value of the first generating binary sequence is produced in each case by binary logical combination of an oldest value of the binary feedback shift register with at least one subsequent value of the binary feedback shift register following the oldest value, according to a fixed feedback pattern, and no segment of the length n occurs more often than once in the fundamental sequence, so that the position of such a segment is uniquely determined with respect to the fundamental sequence the method comprising:

producing an intermediate value by a logical combination of an actual value of the external sequence with an actual value of a second generating sequence;

producing an input value to an analog feedback shift register by superposition of the intermediate value with an analog feedback value derived according to a feedback function from analog values in the analog feedback shift register, the analog feedback shift register having a length n and including a feedback pattern corresponding to a feedback pattern of the binary feedback shift register;

feeding the input value to an input of the analog feedback shift register; and a position of an actual value of the second generating sequence corresponding to a position of a segment with respect to the first generating sequence, the segment including a determinative set of n binary values derived from the analog values in the analog feedback shift register.

2. Method according to claim 1, wherein the first generating sequence includes an m-sequence of length $N=2^n-1$, so that each set of n binary values, except for one, occurs exactly once as a segment of length n therein.

3. Method according to claim 2, wherein the fundamental sequence is a Gold sequence.

4. Method according to claim 1, further comprising:
reading from a table the actual value of the second generating binary sequence using the determinative set as an address to read from.

5. Method according to claim 1, wherein the binary sequences each include the values +1 and −1 and, the logical combination includes a multiplication with a possible change of sign.

6. Method according to claim 5, wherein the magnitude of the feedback function is 1 if the magnitudes of the arguments are each 1.

7. Method according to claim 5, wherein the sign of the feedback function always corresponds to the sign of the logical combination of the arguments.

8. Method according to claim 5, wherein the feedback function is invariant on interchange of the arguments.

9. Method according to claim 5, wherein the feedback function is antisymmetric and monotonic as a function of each argument.

10. Method according to claim 5, wherein the feedback function is substantially a linear combination of the arguments within substantially each sector characterized by specific values of the signs of the arguments.

11. Method according to claim 10, wherein the magnitude of the feedback function substantially corresponds to the mean value of the magnitudes of the arguments.

12. Method according to claim 6, further comprising:
producing the feedback value by multiplication of the value of the feedback function with a factor k<1, which is preferably between 0.90 and 0.99.

13. Method according to claim 5, wherein the determinative set includes binary values which in each case have a same sign as a corresponding analog value in the analog shift register.

14. Method according to claim 1, further comprising:
deriving a basic sequence from the received signal, the external sequence corresponding to a plurality of copies, directly in succession with respect to time, of the basic sequence, and a length of each of the plurality of copies corresponds to the length N of the fundamental sequence.

15. Method according to claim 14, further comprising:
generating the basic sequence by adding values of a plurality of sequences of length N which are derived successively from the received signal.

16. Method according to claim 1, further comprising:
generating a binary output signal indicating complete synchronization if the magnitudes of values of the internal sequence exceed a threshold value.

17. Synchronization circuit for carrying out a received signal synchronization method, said circuit comprising:
an analog feedback shift register having an input configured to receive an external sequence of analog values derived from the received signal and values in the analog feedback shift register;

a feedback circuit connected to taps of the analog feedback shift register according to a specific feedback pattern and configured to evaluate a feedback function and thereby determine a feedback value;

a superposition circuit configured to superpose the feedback value with an intermediate value;

a memory from which a value is configured to be read using a determinative set derived from the values stored in the analog feedback shift register as a memory address; and a logic element configured to produce the intermediate value by logical combination of the value read from the memory with a value in the external sequence of analog values at the input.

18. Synchronization circuit according to claim 17, further comprising:
a gain block configured to produce the feedback value from an initial value and connected to an output of the feedback circuit, and wherein the superposition circuit includes an adder configured to add the feedback value to the intermediate value.

19. Synchronization circuit according to claim 17, further comprising:
a discriminator configured to generate a binary output signal indicating synchronization, including an input connected to an output of the feedback circuit.

20. Receiver for receiving a signal, the receiver comprising at least one synchronization circuit according to claim 17 for deriving an internal sequence from the received signal.

21. Receiver according to claim 20, further comprising at least one pair of identical synchronization circuits, one of which is connected via an inverter and the other directly to a common input.

22. Receiver according to claim 20, further comprising at least one pair of identical synchronization circuits connected via a sampling element to a common input, the receiver further comprising a delay element connected to an input of at least one sampling element and configured to shift sampled values by a part of a chip length.

23. Receiver according to claim 20, further comprising:
an oscillator configured to generate a first sinewave signal and a second sinewave signal phase-shifted relative to the first sinewave signal by 90° ; and at least one pair of identical synchronization circuits; and a mixer connected to an input of each of the identical synchronization circuits and configured to mix the received signal with the first sinewave signal or the second sinewave signal.

24. Synchronization circuit of claim 19, wherein the discriminator further comprises a squaring circuit, a low-pass filter and a threshold value detector.

* * * * *